US 6,416,102 B1

(12) United States Patent  
Howard

(10) Patent No.: US 6,416,102 B1
(45) Date of Patent: Jul. 9, 2002

(54) VEHICLE BODY MOUNT WITH ANTI-ROTATION FEATURE

(75) Inventor: Matthew Brian Howard, Farmington Hills, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/681,338

(22) Filed: Mar. 20, 2001

(51) Int. Cl.[7] .............................................. B62D 23/00
(52) U.S. Cl. ................... 296/35.1; 296/35; 267/140.1; 267/141.1
(58) Field of Search ............... 296/35.1, 35; 267/140.1, 267/8, 141.1, 220

(56) References Cited

U.S. PATENT DOCUMENTS

| | | | |
|---|---|---|---|
| 3,010,757 A | | 11/1961 | De Hann |
| 3,512,447 A | | 5/1970 | Vaughn |
| 3,622,194 A | * | 11/1971 | Bryk et al. ................... 296/35 |
| 3,809,427 A | * | 5/1974 | Bennett ........................ 296/35 |
| 4,046,415 A | * | 9/1977 | Klees et al. ................... 296/35 |
| 4,570,911 A | * | 2/1986 | Konishi ......................... 267/8 |
| 4,637,764 A | | 1/1987 | Imai |
| 4,659,267 A | | 4/1987 | Uno et al. |
| 4,669,711 A | * | 6/1987 | Beer ........................ 267/140.1 |
| 4,753,560 A | | 6/1988 | Ryder et al. |
| 4,819,980 A | | 4/1989 | Sakata et al. |
| 5,112,077 A | * | 5/1992 | Makita ........................ 267/220 |
| 5,170,985 A | * | 12/1992 | Killworth et al. ........... 267/141.1 |
| 5,178,433 A | * | 1/1993 | Wagner ..................... 296/35.1 |
| 5,186,440 A | * | 2/1993 | Schobbe et al. ............. 267/220 |
| 5,219,439 A | * | 6/1993 | Moore et al. ............... 296/35.1 |
| 5,267,630 A | * | 12/1993 | Watanabe et al. ........... 180/297 |
| 5,370,375 A | * | 12/1994 | Kojima ................... 267/140.14 |
| 5,409,283 A | * | 4/1995 | Ban .......................... 296/35.1 |
| 5,580,028 A | * | 12/1996 | Tomczak et al. ............ 267/293 |
| 5,716,112 A | | 2/1998 | Staszak |
| 5,743,509 A | * | 4/1998 | Kanda et al. ............. 267/141.2 |
| 5,799,930 A | * | 9/1998 | Willett ..................... 267/141.4 |
| 5,865,428 A | * | 2/1999 | Kojima ................... 267/140.14 |
| 6,030,016 A | * | 2/2000 | Rice .......................... 296/35.1 |
| 6,030,017 A | * | 2/2000 | Stojkovic et al. .......... 296/35.1 |

* cited by examiner

Primary Examiner—Ken Patel
(74) Attorney, Agent, or Firm—George P. Brown

(57) ABSTRACT

A body mount (10) for use with vehicle of the type including a frame (12) and a body (14). Body mount (10) includes a generally elongated hollow inner member (16) having a central and generally cylindrical channel (18), an outer jacket (20), and a resilient material (22) which is disposed between and which is fixedly coupled to inner member (16) and outer jacket (20), thereby connecting jacket (20) to member (16). Body mount (10) further includes a generally circular top washer or member (24), a generally circular bottom washer or member (26), and a stud or fastener (28) which extends through channel (18) and which includes an anti-rotation feature or tip (50) which allows the body (14) to be secured to the mount by use of a conventional hold-and-drive tool, and which substantially prevents relative rotation between inner member (16), outer member (20) and material (22).

19 Claims, 3 Drawing Sheets

VEHICLE BODY MOUNT WITH ANTI-ROTATION FEATURE

BACKGROUND OF INVENTION

This invention relates to a vehicle body mount having an anti-rotation feature and more particularly, to a shear-type body mount for use with a vehicle having a body and a frame and having an anti-rotation feature which allows the mount to be secured to the vehicle body from a position above the vehicle body without requiring a tool below the mount to prevent relative rotation between the components of the mount during the assembly procedure.

Body mounts are typically used within vehicles including a frame and a body and are operatively disposed and/or coupled to the vehicle frame and body. The mounts include a resilient material which damps and/or absorbs vibrations communicated to the vehicle frame from the road surface and from other portions of the vehicle. Particularly, the body mounts allow the frame and body of the vehicle to move relative to one another to a certain limited degree. In this manner, the body mounts substantially reduce the noise and vibration that is communicated to the vehicle's passenger compartment during vehicle operation.

A conventional body mount includes an inner metal or rigid member which is typically coupled to the body of the vehicle, an outer metal or rigid member or jacket which is typically coupled to the frame of the vehicle, and a resilient member or material (e.g., rubber) which is disposed between and operatively connects the inner metal member and the outer metal member. The resilient material allows the inner member and outer member to move relative to one another to a certain limited degree, effective to allow the vehicle frame and body to move relative to one another, thereby damping vibration and noise that would otherwise be communicated from the vehicle frame to the vehicle body during vehicle operation.

During the vehicle assembly procedure, the outer jacket of a prior body mount is typically first attached to the vehicle frame, by use of conventional fasteners. The body is positioned over the frame and the inner member is then attached to the body by use of a conventional fastener which is inserted through the bottom of the mount and which passes through a channel in the inner member and through a hole in the body.

In order to ensure that the mount is not damaged during assembly, the inner member must generally be stabilized during assembly to insure that the inner member does not rotate or twist relative to the outer member, as such rotation would damage the resilient member which is disposed between the inner and outer members, thereby resulting in poor durability and performance. This stabilization typically requires the fastener to be held from a location below the frame, while a nut is threaded onto the fastener from above the frame. This complicates the assembly procedure, thereby increasing production time and reducing production efficiency. Furthermore, inserting the fastener from below the frame may be difficult or impossible due to components or structures which are already attached to the bottom of the vehicle.

There is therefore a need for a new and improved body mount having an anti-rotation feature, which is effective to couple a vehicle frame to a vehicle body, and which allows the body mount to be attached to the vehicle body from a location above the vehicle body without requiring a tool underneath the body or frame to hold the mount during the attachment procedure.

SUMMARY OF INVENTION

A first non-limiting advantage of the present invention is that it provides a body mount having an anti-rotation feature which allows the mount to be attached to the vehicle body from a location above the vehicle body.

A second non-limiting advantage of the present invention is that it provides a body mount which may be installed in a manner which substantially eliminates the risk of damaging the resilient member or material of the body mount.

A third non-limiting advantage of the present invention is that it provides a body mount which may be attached to the body of a vehicle from a location above the body without requiring a tool underneath the body to stabilize the mount.

According to a first aspect of the present invention, a body mount for use in a vehicle of the type including a frame portion and a body portion is provided. The body mount includes an outer jacket which is adapted to be selectively and fixedly attached to the frame portion; a inner member having an inner channel; a resilient material which is coupled to the inner member and to the outer jacket and which allows for a certain degree of movement of the inner member relative to the outer jacket; and a fastener which is fixedly coupled to the inner member within the inner channel and which extends through the inner channel, the fastener including a threaded portion which is disposed outside of the inner channel and which is effective to receive a nut for coupling the body portion to the inner member, and a tip disposed above the threaded portion and which includes an anti-rotation feature which allows the fastener to be held in a stationary position while the nut is threadingly secured to the threaded portion.

According to a second aspect of the present invention, a body mount is provided for use with a vehicle of the type including a frame portion and a body portion. The body mount includes an outer metal jacket which is generally cylindrical and which includes a pair of flanges which are adapted to be selectively and fixedly attached to the frame portion; a generally cylindrical hollow inner member having an inner surface and a top surface; a washer which is fixedly attached to the top surface of the inner member and which includes an aperture; a resilient member which is coupled to the inner member, to the washer and to the outer jacket and which allows for a certain degree of movement of the inner member relative to the outer jacket; and a stud which passes through the hollow inner member, the stud having an outer coarse surface which frictionally engages the inner surface, thereby fixedly coupling the stud to the inner member, the stud further including a threaded portion which passes through the aperture and which is effective to receive a nut for coupling the body portion to the inner member, and a tip which is disposed above the threaded portion and which has a shape which allows the stud to be held substantially stationary while the nut is threadingly secured to the threaded member, thereby substantially preventing the stud from rotating while the body portion is being coupled to the mount.

According to a third aspect of the present invention, a method is provided for use with a body mount of the type including an inner member which is selectively coupled to a body portion of a vehicle, an outer member which is selectively coupled to a frame portion of the vehicle, and a resilient material which is disposed between the body portion and the frame portion. The method is effective to prevent the inner member from rotating relative to the outer member when the inner member is coupled to the body of the vehicle. The method includes the steps of fixedly attaching a fastener to the inner member, the fastener having a threaded portion which is effective to receive a nut for coupling the body portion to the inner member; forming a shape upon a tip of the threaded portion; and utilizing a hold and drive tool to secure the nut to the threaded portion, the hold and drive tool being effective to receive the tip and to substantially prevent the fastener from rotating while threadingly securing the nut to the threaded portion.

These and other features, aspects, and advantages of the present invention will become apparent by reading the following detailed description of the preferred embodiment of the invention and by reference to the following drawings.

DETAILED DESCRIPTION

Figure 1:
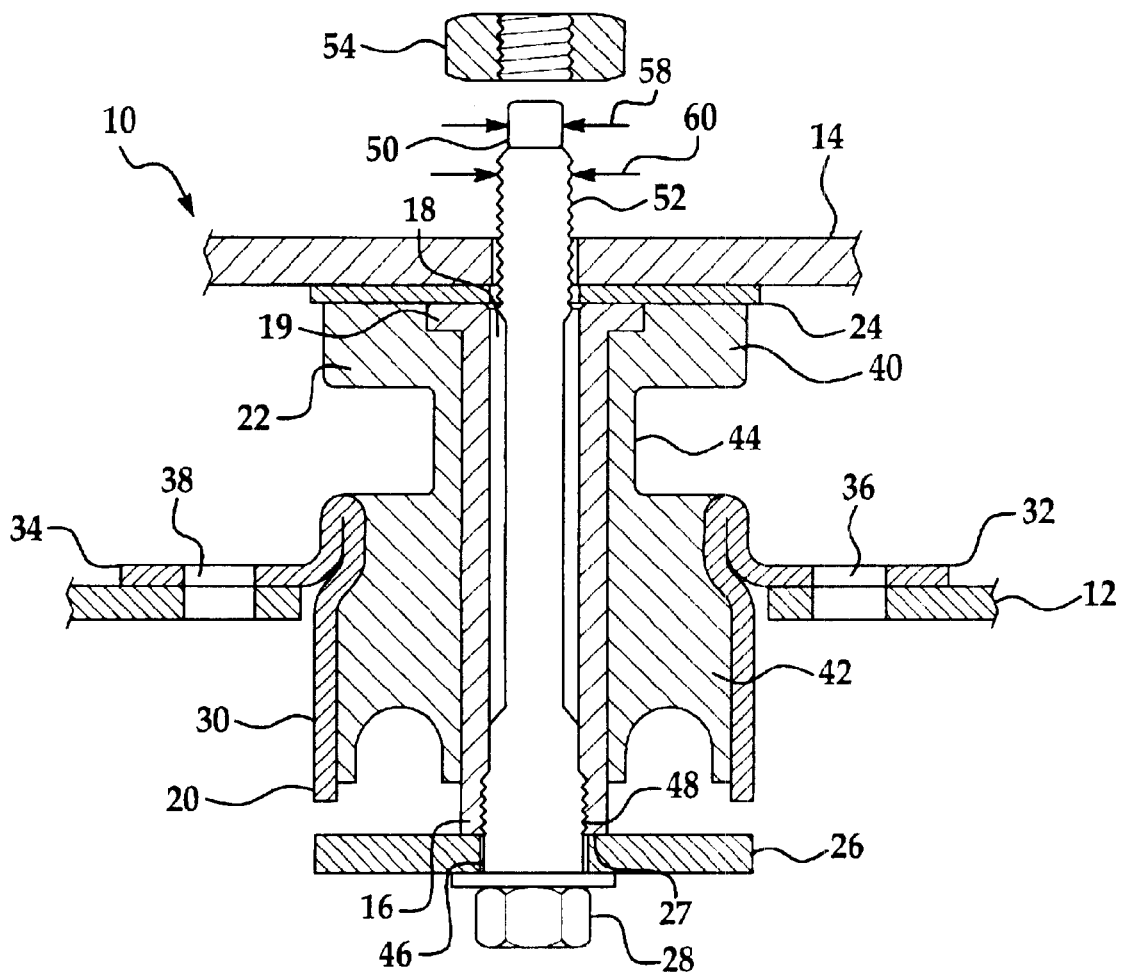
FIG. 1 is a sectional view of a body mount having an anti-rotation feature which is made in accordance with the teachings of the preferred embodiment of the invention.
Figure 2:
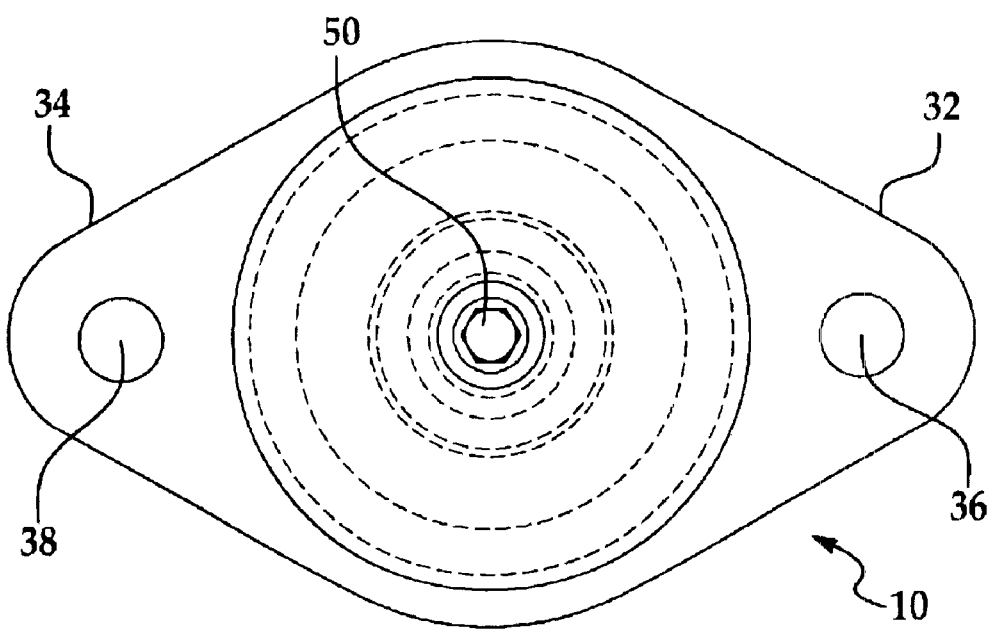
FIG. 2 is a top view of the body mount shown in FIG. 1.
Figure 3:
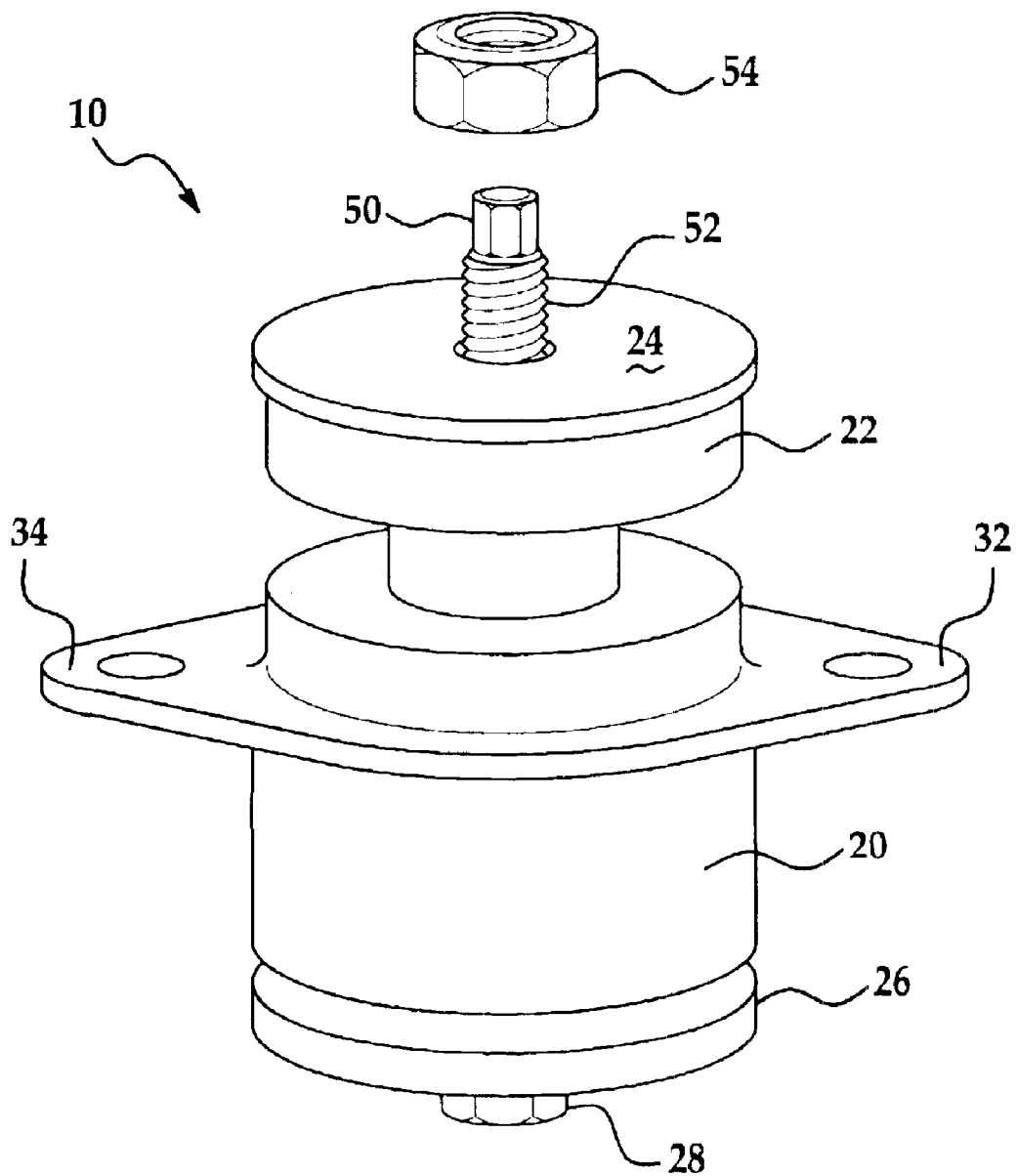
FIG. 3 is a perspective view of the body mount shown in FIG. 1.

Referring now to FIG. 1, there is shown a body mount 10 which is made in accordance with the teachings of the preferred embodiment of the invention and which is adapted to be selectively attached to a portion of a vehicle frame 12 and a portion of a vehicle body 14. It should be appreciated that a vehicle may include several substantially identical body mounts 10 which are placed in predetermined locations around the vehicle and which allow for a certain degree of relative movement between the frame 12 and body 14. In this manner, the body mounts 10 substantially reduce vibrations and loads which are transferred from the vehicle frame 12 to the vehicle body 14.

Body mount 10 includes a generally elongated hollow inner member 16 having a central and generally cylindrical channel 18, an outer member or jacket 20, and a resilient material or member 22 which is disposed between and which is fixedly coupled to inner member 16 and outer jacket 20, thereby connecting jacket 20 to member 16. Body mount 10 further includes a generally circular top washer, plate or member 24, a generally circular bottom washer, plate or member 26, and a stud or fastener 28 which extends through channel 18.

In the preferred embodiment, inner member 16 and outer member 20 are made from a relatively rigid and durable metal material (e.g., steel). Inner member 16 is generally cylindrical in shape and includes an annular ridge 19 which orthogonally projects from the top of member 16 and abuttingly engages washer 24, and a bottom surface 27 which abutting engages washer 26. In the preferred embodiment, washer 26 is fixedly attached (e.g., welded) to ridge 19. Outer jacket 20 includes a generally cylindrical hollow body portion 30 and a pair of orthogonally projecting flanges 32, 34. Each flange 32, 34 includes an aperture 36, 38 for receiving a bolt or other conventional fastener, thereby allowing jacket 20 to be selectively and securely attached to frame 12.

Resilient member 22 is preferably formed or molded from a shear rubber material or any other suitable resilient material. Member 22 is fixedly attached to and is substantially coextensive with the outer surface of inner member 16. Member 22 includes a widened top portion 40 that is further fixedly attached to washer 24, a widened bottom portion 42 that is further fixedly attached to the inner surface of jacket 20, and a narrow neck portion 44 that extends between and connects portions 40 and 42.

Fastener or stud 28 includes a bottom portion having a coarse outer surface 48 which frictionally engages the inner surface defining channel 18. In the preferred embodiment, fastener 28 passes through aperture 46 in washer 26 and is press-fitted into member 16. In this manner, fastener 28 is securely fixed relative to the inner member 16 and washer 26 is fixed between fastener 28 and member 16. In the preferred embodiment, the uppermost end or tip 50 of fastener 28 is hexagonal in shape and provides the anti-rotation feature which is discussed more fully and completely below. Immediately below the upper hexagonal tip 50, is a threaded portion 52 of the fastener 28 which passes through apertures in washer 24 and body 14, and which is effective to receive a conventional threaded nut 54 which secures body 14 to mount 10. Tip 50 has a smaller width 58 than the width 60 of threaded portion 52.

In operation, the hexagonal shape or surface of tip 50 provides an anti-rotation feature or function which substantially prevents the inner member 16 from rotating relative to jacket 20 and/or material 22, thereby preventing damage to material 22. During installation of mount 10, jacket 20 is first attached to frame 12 by use of conventional fasteners (i.e., fasteners secure flanges 32, 34 to frame 12 through apertures 36, 38). Once all of the mounts 10 have been attached to the frame 12 of the vehicle, the body 14 is positioned over the frame 12 and is lowered until it rests on the top of mounts 10 (e.g., as shown in FIG. 1).

The body 14 is then secured to the mount 10 by use of nut 54. The hexagonal tip 50 allows a conventional "hold-and-drive" tool to be used to secure nut 54 to the fastener 28. In other alternate embodiments, tip 50 may have a different polygonal shape or other shape or anti-rotation feature which allows the nut 54 to be secured to mount 10 by different types of hold and drive tools or by a pair of tools. The hold-and-drive tool receives and holds the hexagonal tip 50 while concomitantly threading nut 54 onto portion 52 of the fastener 28. This prevents the fastener 28 and member 16 from rotating relative to the fixed jacket 20 while the nut 54 is secured. This prevents twisting, degradation and/or separation of the material 22. Furthermore, the unique design of body mount 10 allows the mount 10 to be secured to the vehicle body 14 from a position above the body 14 without requiring a tool underneath the body 14. This simplifies the assembly procedure, reduces production time and increases production efficiency. Furthermore, allowing the body to be attached to the mount from a location above the body provides for easier operator access during assembly. Additionally, the unique design of mount 10 allows the mount to be shipped as a single pre-assembled unit which further reduces production time and increases production efficiency.

It is to be understood that the invention is not limited to the exact construction or method which has been previously delineated above, but that various changes and modifications may be made without departing from the spirit and the scope of the following claims.

What is claimed is:

1. A body mount for use with a vehicle including a frame portion and a body portion, said body mount comprising:

an outer jacket which is adapted to be selectively and fixedly attached to said frame portion, said outer jacket including a pair of orthogonally projecting flanges, each having at least one aperture for receiving a fastener, thereby allowing said jacket to be secured to said frame;

a inner member having an inner channel;

a resilient material which is coupled to said inner member and to said outer jacket and which allows for certain degree of movement of said inner member relative to said outer jacket; and a fastener which is fixedly coupled to said inner member within said inner channel and which extends through said inner channel, said fastener including a threaded portion which extends outside of said inner channel and which is effective to receive a nut for coupling said body portion to said inner member, and a tip disposed above said threaded portion and which includes an anti-rotation feature which allows said fastener to be held in a stationary position while said nut is threadingly secured to said threaded member.

2. The body mount of claim 1 wherein said anti-rotation feature is adapted for use with a hold and drive tool.

3. The body mount of claim 2 wherein said anti-rotation feature comprises a hexagonal outer surface.

4. The body mount claim 1 further comprising a first washer which abuttingly engages a top surface of said inner member.

5. The body mount of claim 3 further comprising a bottom washer which abuttingly engages a bottom surface of said inner member.

6. The body mount of claim 1 wherein said fastener includes a coarse outer surface which frictionally engages a portion of an inner surface of said inner member.

7. The body mount of claim 6 wherein said fastener is press-fitted into said inner channel of said inner member.

8. The body mount of claim 1 wherein said resilient material comprises rubber.

9. A body mount for use with a vehicle including a frame portion and a body portion, said body mount comprising:

an outer metal jacket which is generally cylindrical and which includes a pair of orthogonally projecting flanges, each having at least one aperture for receiving a fastener, thereby allowing said jacket to be fixedly attached to said frame portion;

a generally cylindrical hollow inner member having an inner surface and a top surface;

a washer which is fixedly attached to said top surface of said inner member and which includes an aperture;

a resilient member which is coupled to said inner member, to said washer and to said outer jacket and which allows for a certain degree of movement of said inner member relative to said outer jacket; and a stud which passes through said hollow inner member, said stud having an outer course surface which frictionally engages said inner surface, thereby fixedly coupling said stud to said inner member, said stud further including a threaded portion which passes through said aperture and which is effective to receive a nut for coupling said body portion to said inner member, and a tip which is disposed above said threaded portion and which has a shape which allows said stud to be held substantially stationary while said nut is threadingly secured to said threaded member, thereby substantially preventing said stud from rotating while said body portion is being coupled to said mount.

10. The body mount of claim 9 wherein said resilient member is formed from rubber.

11. The body mount of claim 9 wherein said washer is welded to said top surface of said inner member.

12. The body mount of claim 9 wherein said shape is polygonal.

13. The body mount claim 12 wherein said shape is hexagonal.

14. The body mount of claim 9 further comprising a bottom washer which is disposed between a lower portion of said stud and said inner member.

15. The body mount of claim 9 wherein said stud is press-fitted into said inner member.

16. A method for use with a body mount including an inner member which is selectively coupled to a body portion of a vehicle, an outer member which is selectively coupled to a frame portion of said vehicle, and a resilient material which is disposed between said body portion and said frame portion, said method being effective to prevent said inner member from rotating relative to said outer member when said inner member is coupled to said body of said vehicle, said method comprising the steps of:

fixedly attaching a fastener to said inner member, said fastener having a threaded portion which is effective to receive a nut for coupling said body portion to said inner member;

providing a pair flanges, wherein each of said flanges having at least one aperture for receiving a fastener;

fixedly coupling said pair of flanges to said outer member in a manner causing said pair of flanges to project orthogonally from said outer member;

forming a shape upon a tip of said threaded portion; and utilizing a hold and drive tool to secure said nut to said threaded portion, said hold and drive tool being effective to receive said tip and to substantially prevent said fastener from rotating while threadingly securing said nut to said threaded portion.

17. The method of claim 16 wherein said shape is polygonal.

18. The method of claim 17 wherein said shape is hexagonal.

19. The method of claim 16 wherein said fastener is press-fitted within said inner member.

* * * * *